(12) United States Patent
Dunlap

(10) Patent No.: US 6,808,126 B1
(45) Date of Patent: Oct. 26, 2004

(54) LAWN MOWER FLUID DISPENSER

(76) Inventor: Claude O. Dunlap, 3281 Highway 1196, Vick, LA (US) 71331

(*) Notice: Subject to any disclaimer, the term of this patent is extended or adjusted under 35 U.S.C. 154(b) by 0 days.

(21) Appl. No.: 10/462,925

(22) Filed: Jun. 18, 2003

(51) Int. Cl.$^7$ .............................. A01G 25/09; B05B 3/02
(52) U.S. Cl. ......................... 239/172; 239/74; 239/175; 239/222.11
(58) Field of Search ........................... 239/71, 74, 146, 239/172, 175, 222.11, 302, 569, 581.1, 588, DIG. 6; 56/16.8, 56.2, DIG. 9

(56) References Cited

U.S. PATENT DOCUMENTS

| | | | |
|---|---|---|---|
| 3,477,212 A | * | 11/1969 | Coffman ..................... 56/16.8 |
| 3,535,862 A | * | 10/1970 | Wittwer ...................... 56/16.8 |
| 3,942,308 A | | 3/1976 | Vicendese et al. |
| 4,821,959 A | * | 4/1989 | Browing ..................... 56/16.8 |
| 4,926,622 A | * | 5/1990 | McKee ........................ 56/16.8 |
| 5,106,020 A | | 4/1992 | Harrell |
| 5,195,308 A | | 3/1993 | Grote et al. |
| 5,368,332 A | * | 11/1994 | Dittrich et al. ............. 239/172 |
| 5,385,306 A | | 1/1995 | Cervenka |
| D359,963 S | | 7/1995 | Pink et al. |
| 5,533,676 A | | 7/1996 | Conley |
| 6,145,288 A | | 11/2000 | Tamian et al. |
| 6,189,805 B1 | * | 2/2001 | West et al. ................... 239/74 |
| 6,254,017 B1 | * | 7/2001 | Kuo ......................... 239/581.1 |

\* cited by examiner

Primary Examiner—John J. Vrablik

(57) ABSTRACT

A lawn mower fluid dispenser includes a fluid dispensing device for a riding lawn mower having a front end and a rear end. A blade cover is positioned generally between the front and rear ends. The device includes a container having a bottom wall, a top wall and a peripheral wall. An indicator for determining an amount of fluid positioned within the container is fluidly coupled to the container. A mounting assembly removably supports the container on the rear end of the lawn mower. An elongated hose has a first end and a second end. The first end is fluidly coupled to the container. A nozzle is fluidly coupled to the second end. The nozzle is removably extendable through an aperture in the blade cover. A fluid may be positioned in the container such that the fluid is dispensed through the nozzle.

12 Claims, 4 Drawing Sheets

LAWN MOWER FLUID DISPENSER

BACKGROUND OF THE INVENTION

1. Field of the Invention

The present invention relates to lawn fluid dispensing devices and more particularly pertains to a new lawn fluid dispensing device for dispensing fluids while a lawn is being mowed.

2. Description of the Prior Art

The use of lawn fluid dispensing devices is known in the prior art. U.S. Pat. No. 5,195,308 describes a lawn mower and dispensing system combination that includes a plurality of nozzles for dispensing liquid. U.S. Pat. No. 5,106,020 describes another device for mounting a dispensing device on a riding a lawn mower so that the user may direct a spray nozzle where needed while riding the lawn mower. While these devices fulfill their respective, particular objectives and requirements, the need remains for a device that is easily retrofittable to existing lawn mowers and utilizes the action of the cutting blade for spreading the fluid to be dispensed.

SUMMARY OF THE INVENTION

The present invention meets the needs presented above by providing a device that is removably mountable on a riding lawn mower. The device includes a container that supplies a fluid to a nozzle for dispensing the fluid on the cutting blade of the lawn mower.

Another object of the present invention is to provide a new lawn fluid dispensing device that includes an indicator for determining the level of the fluid within the container.

To this end, the present invention generally comprises a fluid dispensing device for a riding lawn mower having a front end and a rear end. A blade cover is positioned generally between the front and rear ends. The device includes a container having a bottom wall, a top wall and a peripheral wall extending between and is attached to the bottom and top walls. The top wall has an opening therein for accessing an interior of the container. An indicator for determining an amount of fluid positioned within the container is fluidly coupled to the container. A mounting assembly removably supports the container on the rear end of the lawn mower. An elongated hose has a first end and a second end. The first end is fluidly coupled to the container. A nozzle is fluidly coupled to the second end. The nozzle is removably extendable through an aperture in the blade cover. A fluid may be positioned in the container such that the fluid is dispensed through the nozzle.

There has thus been outlined, rather broadly, the more important features of the invention in order that the detailed description thereof that follows may be better understood, and in order that the present contribution to the art may be better appreciated. There are additional features of the invention that will be described hereinafter and which will The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
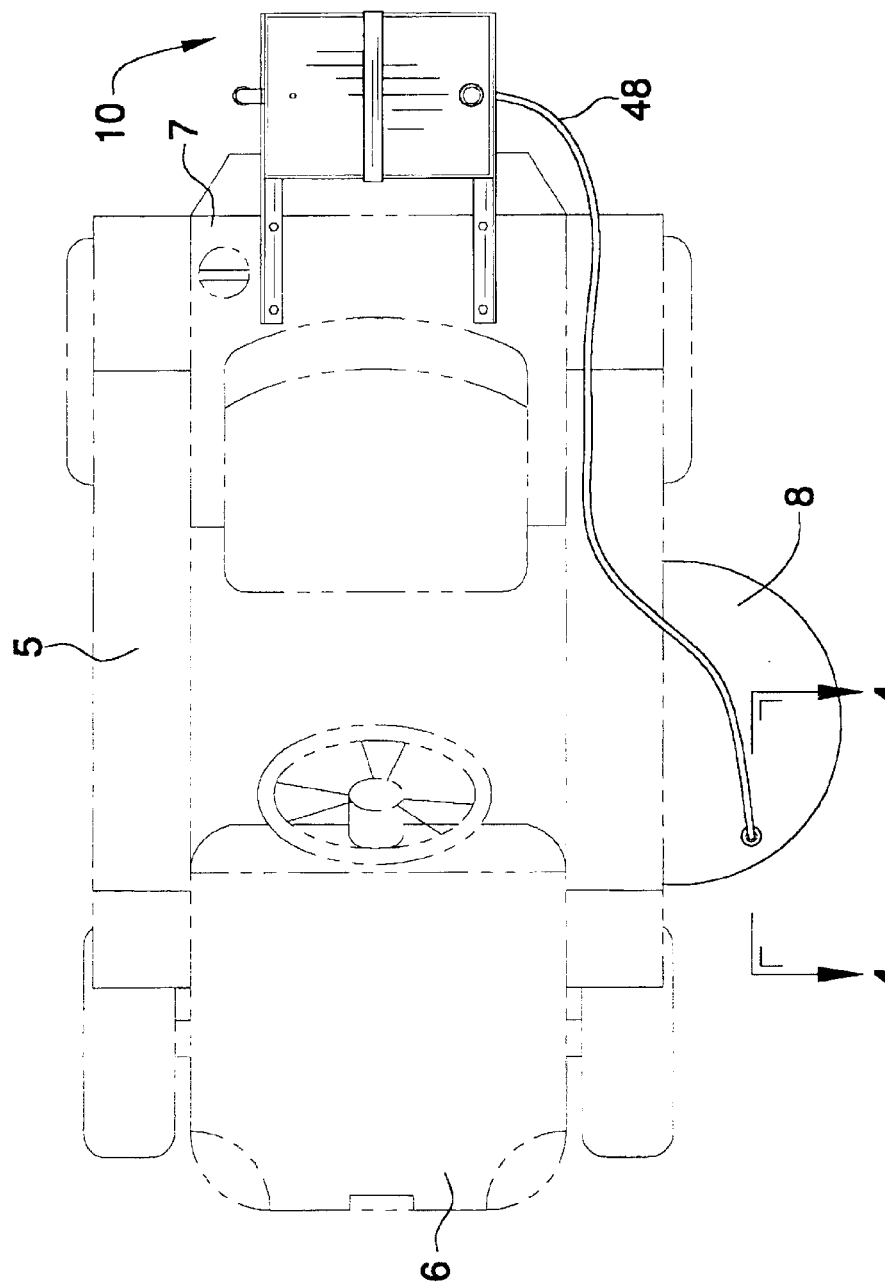
FIG. 1 is a schematic top view of a lawn mower fluid dispenser according to the present invention.
Figure 2:
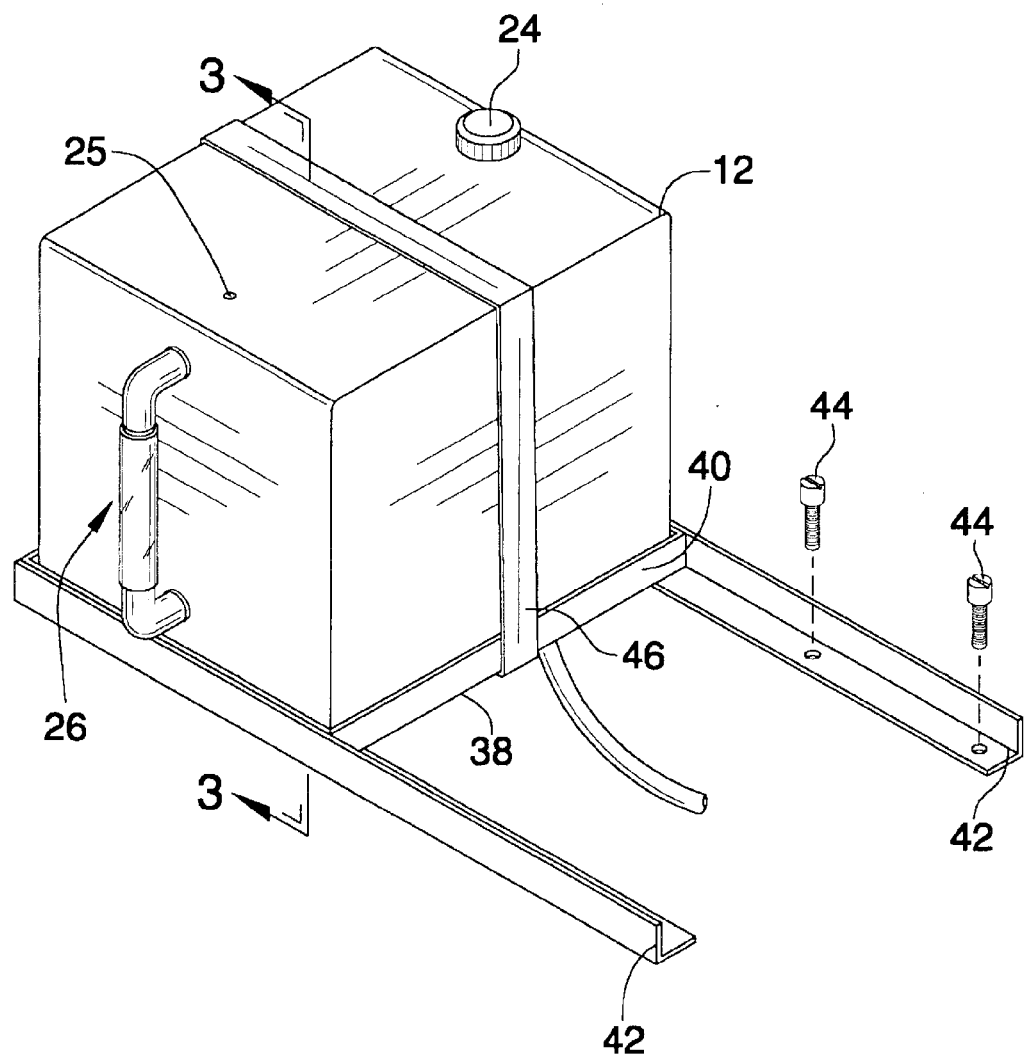
FIG. 2 is a schematic perspective view of the present invention.
Figure 3:
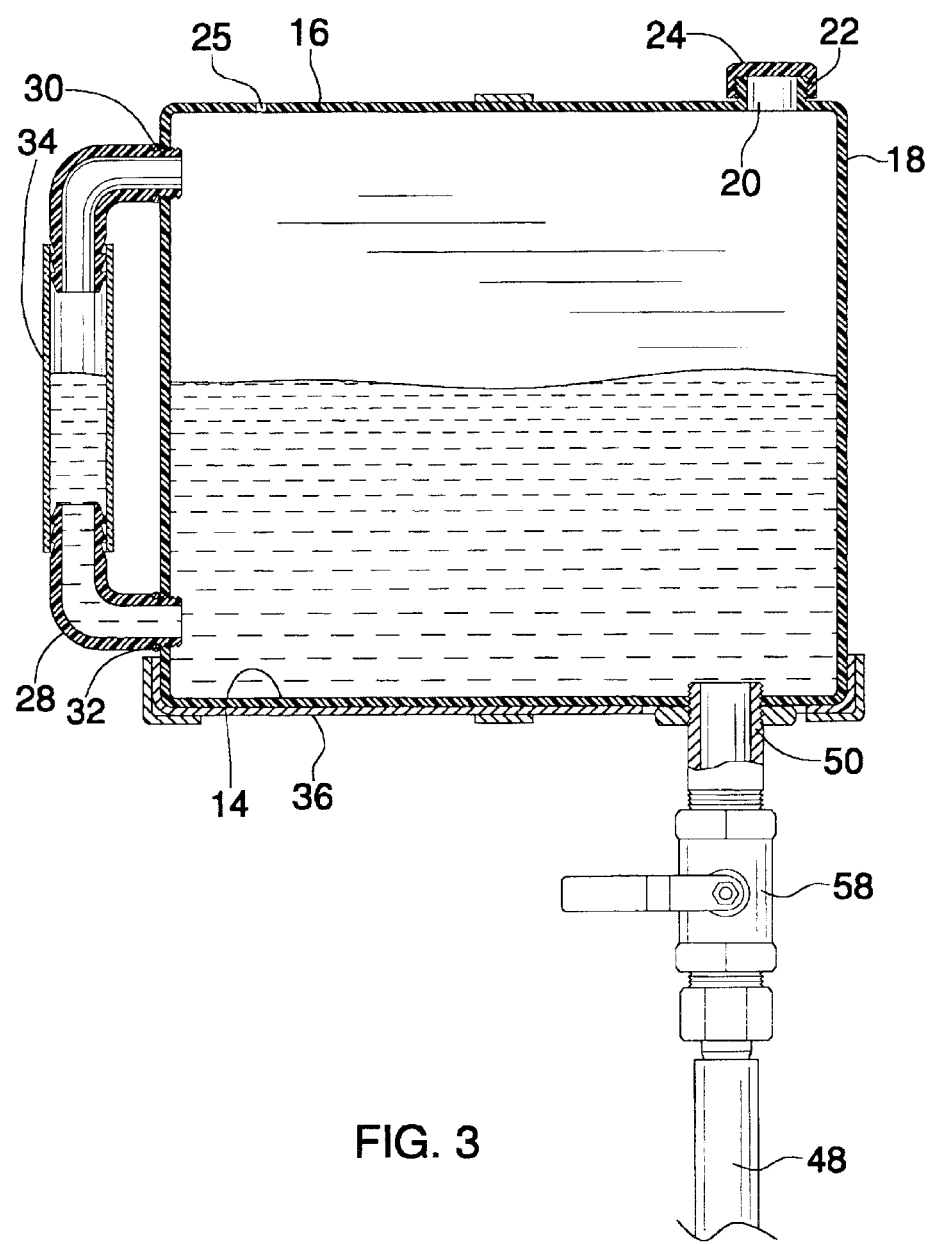
FIG. 3 is a schematic cross-sectional view taken along line 3—3 of FIG. 2 of the present invention.
Figure 4:
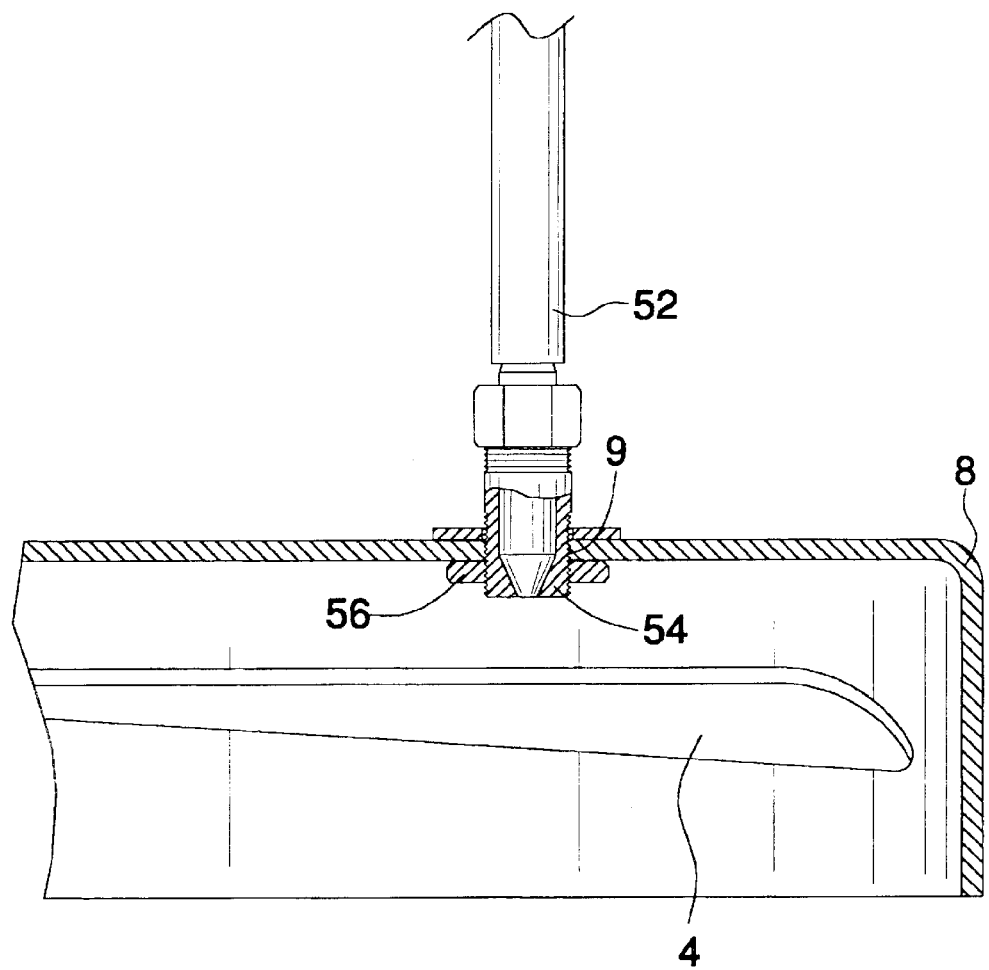
FIG. 4 is a schematic cross-sectional view taken along line 4—4 of FIG. 1 of the present invention.

With reference now to the drawings, and in particular to FIGS. 1 through 4 thereof, a new lawn fluid dispensing device embodying the principles and concepts of the present invention and generally designated by the reference numeral 10 will be described.

As best illustrated in FIGS. 1 through 4, the lawn mower fluid dispenser 10 generally comprises a device selectively positioned on a conventional riding lawn mower 5. The lawn mower 5 has a front end 6 and a rear end 7. A blade cover 8 is positioned generally between the front 6 and rear 7 ends. The device, or dispenser 10, includes a container 12 having a bottom wall 14, a top wall 16 and a peripheral wall 18 extending between and being attached to the bottom 14 and top 16 walls. The top wall 16 has an opening 20 therein for accessing an interior of the container 12. A peripheral lip 22 is attached to and extends upwardly from a peripheral edge of the opening 20. The peripheral lip 22 is threaded. A threaded cap 24 is threadably coupled to the peripheral lip 22 for selectively opening or closing the opening 20. A second opening 26 preferably extends through the top wall 16 so that fluid may easily flow outward of the container 12.

An indicator 26 for determining an amount of fluid positioned within the container 12 is fluidly coupled to the container 12. The indicator 26 includes an elongated tubular member 28 having an upper end and a lower end 32. Each of the upper 30 and lower 32 ends is fluidly coupled to the container 12. Each of the upper 30 and lower 32 ends is positioned on the peripheral wall 18. The upper end 30 is positioned generally adjacent to the top wall 16 and the lower end 32 is positioned generally adjacent to the bottom wall 14 so that the level of any fluid positioned within the container 12 will be at the same level within the tubular member 28. The tubular member 28 includes a substantially transparent area 34. The transparent area 34 is preferably centrally located so that a user of the device 10 may visually determine if the fluid level is becoming low.

A mounting assembly removably supports the container 12 on the rear end 7 of the lawn mower 5. The mounting assembly includes a panel 36 having a peripheral edge 38. A perimeter lip 40 is attached to and extends upwardly from the peripheral edge 38. At least two brackets 42 are attached to and extend away from the panel 36. The brackets 42 may be removably attached to the lawn mower 5 using conventional bolts 44 or screws which may be extended through the brackets 42 and into the lawn mower 5. The brackets 42 preferably extend in the same direction. Preferably, a securing member 46 is attached to the panel 36 for removably securing the container 12 to the panel 36. The securing member 46 ideally includes a strap that is attached to and extends over the panel 36. The container 12 may be positioned on the panel 36 and the strap, or securing member 46, positioned over the container 12.

An elongated hose 48 has a first end 50 and a second end 52. The first end 50 is fluidly coupled to the container 12 and is positioned in the bottom wall 14 of the container 12. A nozzle 54 is fluidly coupled to the second end 52. The nozzle 54 has a threaded outer surface. The nozzle 54 is removably extendable through an aperture 9 in the blade cover 8. A fastener 56 is threadably coupled to the nozzle 54 for selectively securing the nozzle 54 in the aperture 9. The fastener 56 is preferably a threaded nut. A valve 58 is fluidly coupled to the hose 48 for selectively opening or closing the hose 48.

In use, a fluid, such as a pesticide or a fertilizer, is positioned in the container 12. As the lawn mower 5 is used, the valve 58 is opened such that the fluid is dispensed through the nozzle 54. As the fluid strikes the rotating blade 4 of the lawn mower 5, the blade 4 spreads the liquid so that it evenly saturates the area being mowed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fluid dispensing device for a riding lawn mower, the lawn mower having a front end and a rear end, a blade cover being positioned generally between the front and rear ends, said device comprising:

a container having a bottom wall, a top wall and a peripheral wall extending between and being attached to said bottom and top walls, said top wall having an opening therein for accessing an interior of said container;

an indicator for determining an amount of fluid positioned within said container being fluidly coupled to said container;

a mounting assembly for removably supporting said container on the rear end of the lawn mower;

an elongated hose having a first end and a second end, said first end being fluidly coupled to said container, a nozzle being fluidly coupled to said second end, said nozzle being removably extendable through an aperture in a top wall of the blade cover such that said nozzle is directed downward toward blades of the lawn mower; and wherein a fluid may be positioned in said container such that said fluid is vertically dispensed through said nozzle and said fluid strikes said blades as said blades rotate such that said fluid is dispersed by said blades.

2. The fluid dispensing device of claim 1, wherein said indicator includes an elongated tubular member having an upper end and a lower end, each of said upper and lower ends being fluidly coupled to said container, each of said upper and lower ends being positioned on said peripheral wall, said upper end being positioned generally adjacent to said top wall, said lower end being positioned generally adjacent to said bottom wall, said tubular member including a substantially transparent area, said transparent are being spaced from said container.

3. The fluid dispensing device of claim 1, further including a valve being fluidly coupled to said hose for selectively opening or closing said hose.

4. The fluid dispensing device of claim 1, further including a peripheral lip being attached to and extending upwardly from a peripheral edge of said opening, said peripheral lip being threaded, a threaded cap being threadably coupled to said peripheral lip for selectively opening or closing said opening.

5. The fluid dispensing device of claim 4, wherein said indicator includes an elongated tubular member having an upper end and a lower end, each of said upper and lower ends being fluidly coupled to said container, each of said upper and lower ends being positioned on said peripheral wall, said upper end being positioned generally adjacent to said top wall, said lower end being positioned generally adjacent to said bottom wall, said tubular member including a substantially transparent area, said transparent are being spaced from said container.

6. The fluid dispensing device of claim 5, wherein said mounting assembly includes a panel, at least two brackets being attached to and extending away from said panel, wherein said brackets may be removably attached to the lawn mower, said container being removably positionable on said panel.

7. The fluid dispensing device of claim 6, further including a strap being attached to and extending over said panel, wherein said container may be positioned on said panel and said strap positioned over said container.

8. The fluid dispensing device of claim 7, wherein said nozzle has a threaded outer surface, a fastener being threadably coupled to said nozzle for selectively securing said nozzle in said aperture.

9. The fluid dispensing device of claim 8, wherein said nozzle has a threaded outer surface, a fastener being threadably coupled to said nozzle for selectively securing said nozzle in said aperture.

10. The fluid dispensing device of claim 9, further including a valve being fluidly coupled to said hose for selectively opening or closing said hose.

11. The fluid dispensing device of claim 1, wherein said mounting assembly includes a panel, at least two brackets being attached to and extending away from said panel, wherein said brackets may be removably attached to the lawn mower, said container being removably positionable on said panel.

12. The fluid dispensing device of claim 11, further including a strap being attached to and extending over said panel, wherein said container may be positioned on said panel and said strap positioned over said container.

* * * * *